E. T. STARR.
ADJUSTABLE-BRACKET.
No. 171,746. Patented Jan. 4, 1876.
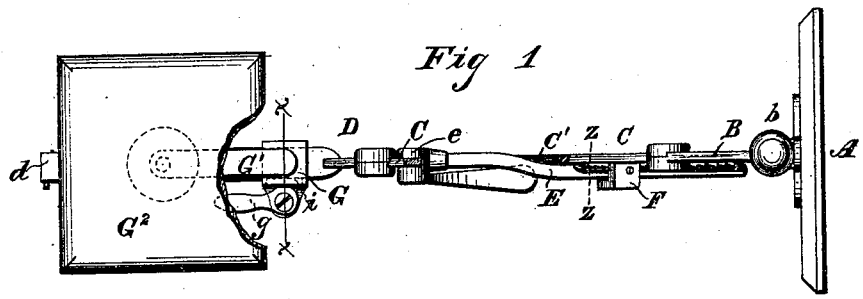
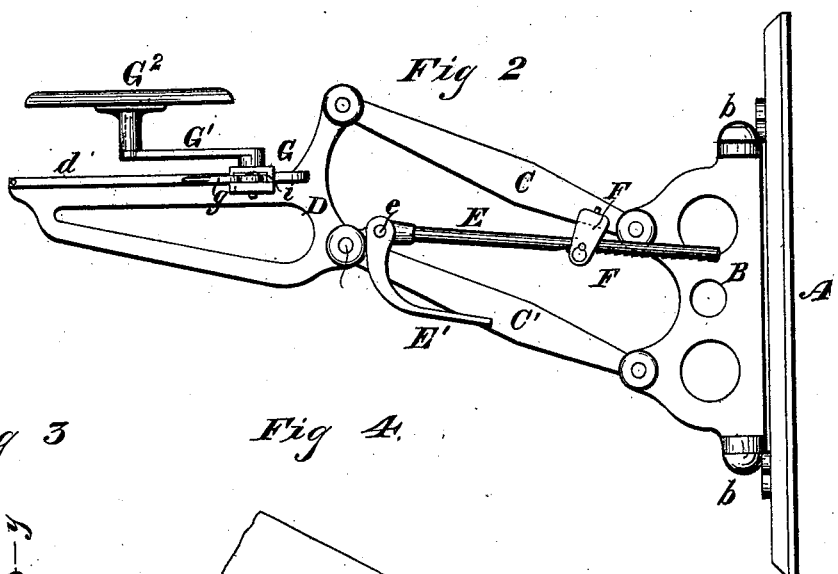
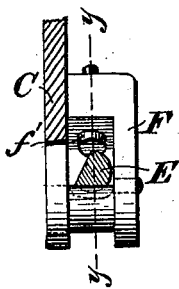
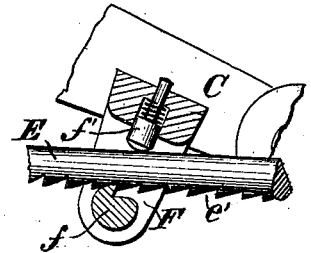
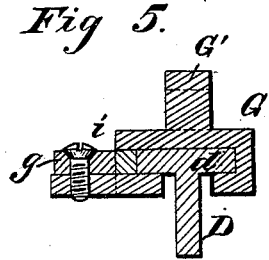
WITNESSES
Wm A Skinkle
Wm J Peyton
INVENTOR
Eli T Starr.
By his Attorney
W. D. Baldwin

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN ADJUSTABLE BRACKETS.

Specification forming part of Letters Patent No. 171,746, dated January 4, 1876; application filed December 13, 1875.

*To all whom it may concern:*

Be it known that I, ELI T. STARR, of Philadelphia, Pennsylvania, have invented certain new and useful Improvements in Adjustable Brackets, of which the following is a specification:

My present invention constitutes an improvement on the bracket shown in Letters Patent No. 169,382, granted to me November 2, 1875.

The subject-matter claimed will be hereinafter specified.

In the accompanying drawings, Figure 1 represents a plan view, and Fig. 2 a side elevation, of my improved apparatus. Fig. 3 represents a transverse section therethrough on the line $z\,z$ of Fig. 1; Fig. 4, a vertical section of a portion of the apparatus on the line $y\,y$ of Fig. 3; and Fig. 5, a vertical section on the line $x\,x$ of Fig. 1.

Except as hereinafter specified, the details of construction of the several parts are similar to those shown in the patent above mentioned, and therefore need not be particularly described herein.

A represents a wall-plate; B, a crane-plate, swinging on pivots $b$ on the wall-plate. C C' are parallel rule-arms pivoted at one end to the bracket, and at the other to a frame, D, so as to allow them to play freely vertically while preserving the horizontality of the frame D. A ratchet bar, E, pin-jointed at $e$, and provided with a trigger, E', moves endwise through a guide-frame, F. The notches $e'$ of this bar engage with a stop, $f$, in the frame. A spring-piston, $f'$, working in a recess in the guide-frame F, presses the rod E, so as to insure the engagement of its ratchet-teeth with the stop. The upper end of the rod E is beveled on one side, as shown in Figs. 1 and 3, so as to permit it to work closely to the upper arm or radius-bar C. The top bar $d$ of the frame D is made T-shaped, to serve as a way upon which a clamp-box, G, slides, and upon which it is clamped in any desired position, by means of a cam-lever, $q$, pivoted on a lug on said box, and acting on a block, $i$, working in a guide-slot in the side of said box. An arm, $G^1$, carries a pivoted or stud pin upon which a table or tray, $G^2$, is pivoted so as to turn freely.

This table can be adjusted nearer to or farther from the pivots of the crane, so as to increase or diminish the length of the bracket; and, as the tray always remains in the same vertical plane as that of its supports, lateral strain and twisting of the joints of the bracket are prevented.

I do not, however, broadly claim a longitudinally-sliding bracket, as that is old; but I am not aware that, prior to the date of my invention, a laterally-swinging bracket has been constructed with a longitudinally-adjustable table-supporting arm located in advance of the joints of the bracket.

I claim as my invention—

1. The combination of the crane-plate, the parallel bars pivoted thereto, the table-supporting frame, to which said bars are pivoted, the ratchet-bar and detent, and the adjustable table-supporting arm mounted on the supporting-frame in front of its pivots, these members being constructed and operating as set forth.

2. The combination of the table-supporting frame, the box carrying the table-arm, and the clamp-lever, these members being constructed and operating as set forth.

3. The combination of the parallel arms, the ratchet-bar, the guide-frame, its stop, and spring-piston, these members being constructed and operating as set forth.

In testimony whereof I have hereunto subscribed my name.

ELI T. STARR.

Witnesses:
JAS. B. WILLIAMS,
J. W. DE BARGER.